(12) United States Patent
Zhang

(10) Patent No.: US 12,370,988 B2
(45) Date of Patent: Jul. 29, 2025

(54) CONTROL METHOD AND ELECTROMECHANICAL BRAKING SYSTEM FOR BRAKING SYSTEM

(71) Applicant: Robert Bosch GmbH, Stuttgart (DE)

(72) Inventor: Xiaokun Zhang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 18/365,848

(22) Filed: Aug. 4, 2023

(65) Prior Publication Data

US 2024/0042983 A1 Feb. 8, 2024

(30) Foreign Application Priority Data

Aug. 8, 2022 (CN) .......................... 202210944056.7

(51) Int. Cl.
| | |
|---|---|
| *B60T 8/92* | (2006.01) |
| *B60T 7/12* | (2006.01) |
| *B60T 8/172* | (2006.01) |
| *B60T 8/1761* | (2006.01) |
| *B60T 8/32* | (2006.01) |
| *B60T 8/88* | (2006.01) |
| *B60T 13/74* | (2006.01) |
| *B60T 17/22* | (2006.01) |
| *F16D 65/18* | (2006.01) |
| *G01D 5/14* | (2006.01) |
| *F16D 121/24* | (2012.01) |

(52) U.S. Cl.
CPC .................. *B60T 8/92* (2013.01); *B60T 7/12* (2013.01); *B60T 8/172* (2013.01); *B60T 8/17616* (2013.01); *B60T 8/3255* (2013.01); *B60T 8/885* (2013.01); *B60T 13/746* (2013.01); *B60T 17/22* (2013.01); *F16D 65/183* (2013.01); *G01D 5/142* (2013.01); *B60T 2220/04* (2013.01); *B60T 2270/10* (2013.01); *B60T 2270/402* (2013.01); *B60T 2270/406* (2013.01); *F16D 2121/24* (2013.01)

(58) Field of Classification Search
CPC .............. B60T 8/92; B60T 7/12; B60T 8/172; B60T 8/17616; B60T 8/3255; B60T 8/885; B60T 13/746; B60T 17/22; B60T 2220/04; B60T 2270/10; B60T 2270/402; B60T 2270/406; F16D 65/183; F16D 2121/24; G01D 5/142
See application file for complete search history.

(56) References Cited

U.S. PATENT DOCUMENTS

2024/0262333 A1* 8/2024 Li ........................... B60T 13/74

* cited by examiner

*Primary Examiner* — Jacob M Amick
(74) *Attorney, Agent, or Firm* — Maginot, Moore & Beck LLP

(57) ABSTRACT

A control method is for a braking system that includes an electronically controlled mechanical brake with a first motor and a second motor. The method includes detecting a pedal stroke and determining a total required braking torque based on a pedal stroke/total braking torque curve, distributing the total braking torque to the first motor and the second motor to determine a target torque for the first motor and a target torque for the second motor, and driving the first motor and the second motor to operate based on the target torques. The method further includes monitoring an operating current and a rotational speed of the first motor and the second motor, and using motor characteristic curves of the first motor and the second motor to calculate a first computed output torque and a second computed output torque.

12 Claims, 19 Drawing Sheets

CONTROL METHOD AND ELECTROMECHANICAL BRAKING SYSTEM FOR BRAKING SYSTEM

This application claims priority under 35 U.S.C. § 119 to patent application no. CN 2022 1094 4056.7, filed on Aug. 8, 2022 in China, the disclosure of which is incorporated herein by reference in its entirety.

The disclosure relates to the field of vehicle braking devices, and more specifically, it pertains to a novel control method and an electromechanical braking system.

BACKGROUND

An electromechanical braking system is a device that utilizes an electric motor to actuate the brake caliper for braking. Compared to conventional hydraulic brake systems, it offers advantages such as rapid response, simple structure, and ease of maintenance. As vehicles move towards electrification and intelligence, electromechanical braking systems, due to their compatibility with electric control systems, have become a trend in the development of braking systems.

SUMMARY

The purpose of the present disclosure is to solve or at least alleviate the problems existing in the prior art.

On the one hand, a control method for a braking system is provided, wherein the braking system includes an electronically controlled mechanical brake with dual motors. The method comprises the following steps:

- detecting the pedal stroke and determining the total required braking torque T based on the pedal stroke/total brake torque curve,
- allocating the total braking torque to the first motor and the second motor to determine the target torques $T1\_t$ and $T2\_t$ for the first motor and the second motor, respectively,
- driving the first motor and the second motor to operate based on the target torques $T1\_t$ and $T2\_t$,
- calculating the computed output torques $T1\_c$ and $T2\_c$ based on the operating current and rotational speed of the first motor and the second motor, as well as the motor characteristic curves of the first motor and the second motor,
- detect the total output torque To of the first motor and the second motor after coupling;
- performing reference calibration, wherein the reference calibration comprises:
- checking whether $|T1\_t - T1\_c| \leq A1$ holds true, if yes, maintain the operational state of the first motor, if not, adjust the first motor;
- checking whether $|T2\_t - T2\_c| \leq A2$ holds true, if yes, maintain the operational state of the second motor, if not, adjust the second motor; and
- checking whether $|T - To| \leq A$ holds true, if yes, maintain the operational state of both the first motor and the second motor, if not, adjust either the first motor or the second motor;
- repeating the above steps until $|T1\_t - T1\_c| \leq A1$, $|T2\_t - T2\_c| \leq A2$ and $|T - To| \leq A$ are all established, A, A1 and A2 are in the range of 0 to 0.1.

On the other hand, an electromechanical braking system is provided, which includes an electronic mechanical brake and an electronic control unit connected to the electronic mechanical brake. The electronic mechanical brake comprises: a first motor and a second motor; a transmission device connected to the first motor and the second motor; and a brake actuator connected to the transmission device to transmit the braking torque of the first motor and the second motor to the brake actuator. The electromechanical braking system performs the method according to the examples of the disclosure.

The device according to the examples of the disclosure provides an axially compact dual-motor electromechanical braking system and realizes the coordinated control of the dual motors and achieves various functions according to the method of the disclosure.

BRIEF DESCRIPTION OF THE DRAWINGS

Reference is made to the drawings to facilitate a better understanding of the disclosure. It will be readily understood by those skilled in the art that these drawings are provided for illustrative purposes only and are not intended to limit the scope of the present disclosure. Additionally, like numerals are used to represent similar components throughout the figures, wherein.

DETAILED DESCRIPTION

Figure 1:
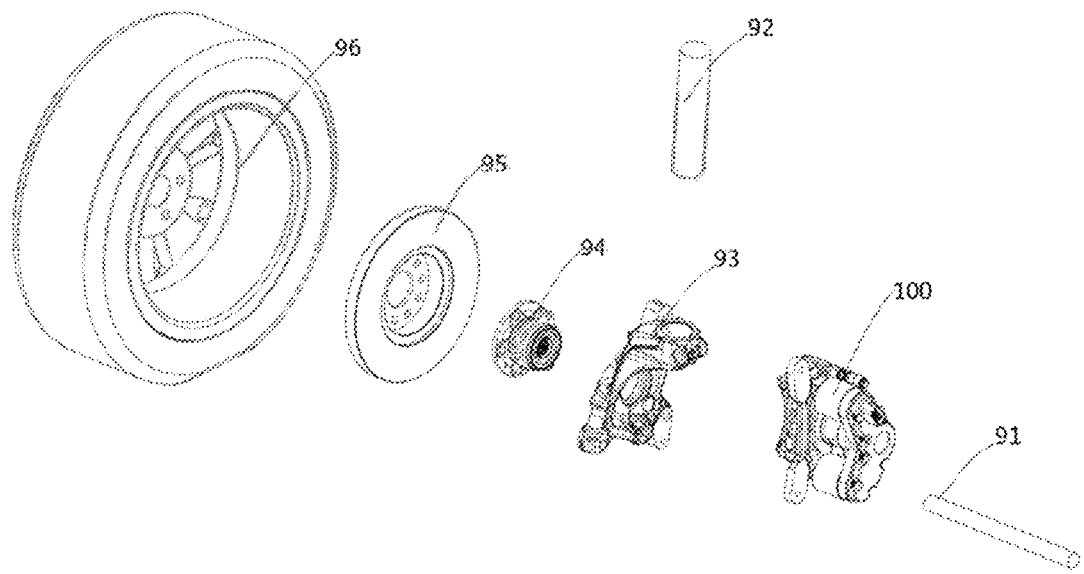
FIG. 1 shows an installation diagram of the electronic mechanical brake according to an example.

FIG. 1 illustrates an installation diagram of an electronic mechanical brake according to an example of the disclosure. The diagram shows a rotating shaft 91, a damper 92, a bearing 94, a steering knuckle arm 93, a brake disc 95, and a wheel 96. Additionally, the electronic mechanical brake 100, according to an example, is driven by an electric motor to apply braking force by clamping the brake disc 95 with a brake caliper. During assembly, the electronic mechanical brake 100 is mounted on the steering knuckle arm 93, while accommodating in the compact space inside the hub of the wheel 96.

Figure 2:
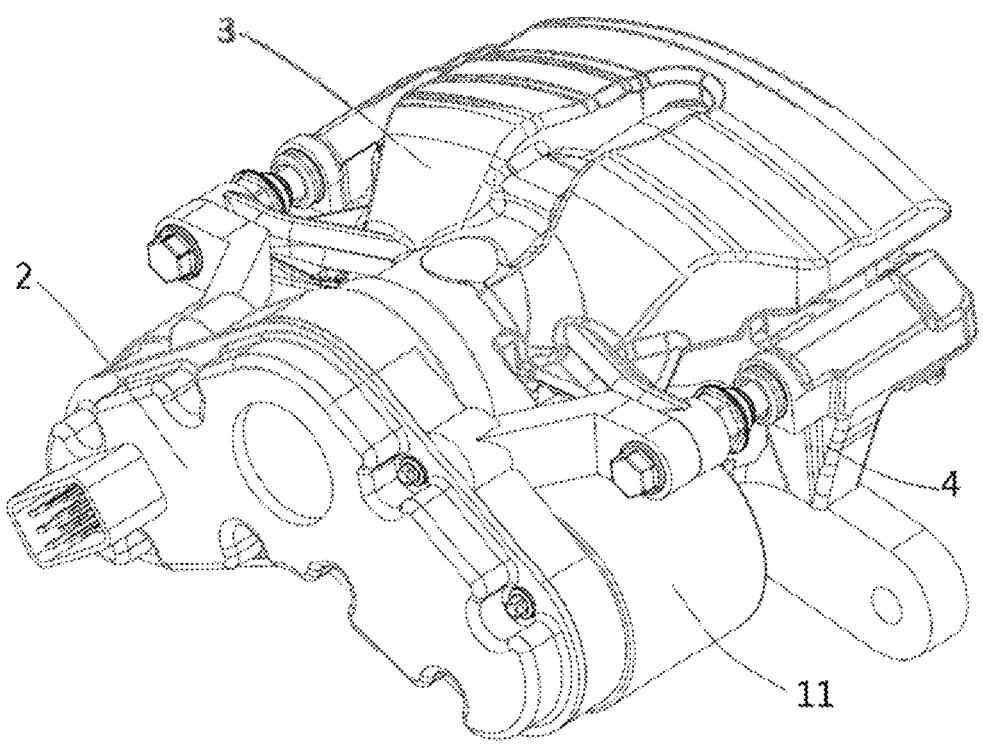
FIG. 2 shows a three-dimensional view of the electronic mechanical brake according to an example.

FIG. 2 illustrates an electronic mechanical brake according to an example, comprising two brake motors 11 and 12, a transmission device 2 connected to the two brake motors 11 and 12, and a brake actuator 3 connected to the transmission device 2. The transmission device 2 transfers the braking torque from the two brake motors 11 and 12 to the brake actuator 3. Although the illustrated example includes two brake motors 11 and 12, this electronic mechanical brake can be used for the main braking wheels, such as the front wheels of a vehicle, that require greater braking torque. For electronic mechanical brakes on the rear wheels of a vehicle, only one brake motor may be configured, and accordingly, the housing and transmission device 2 are correspondingly modified.

Figure 3:
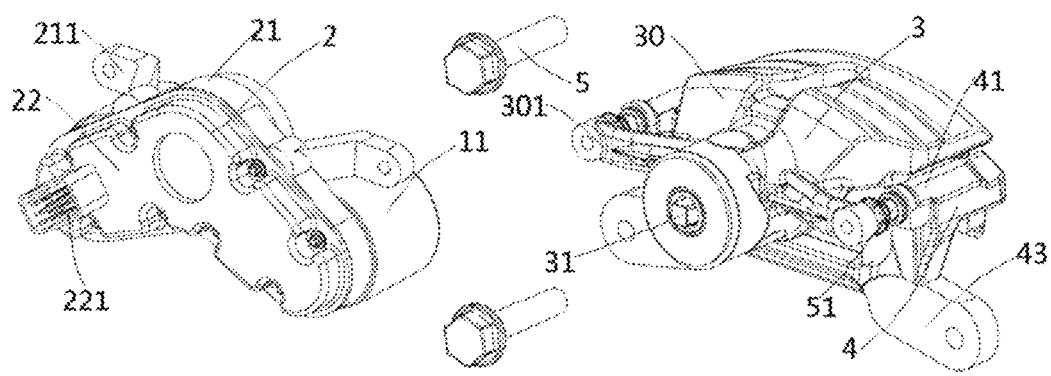
FIG. 3 shows an exploded view of the electronic mechanical brake according to an example.
Figure 4:
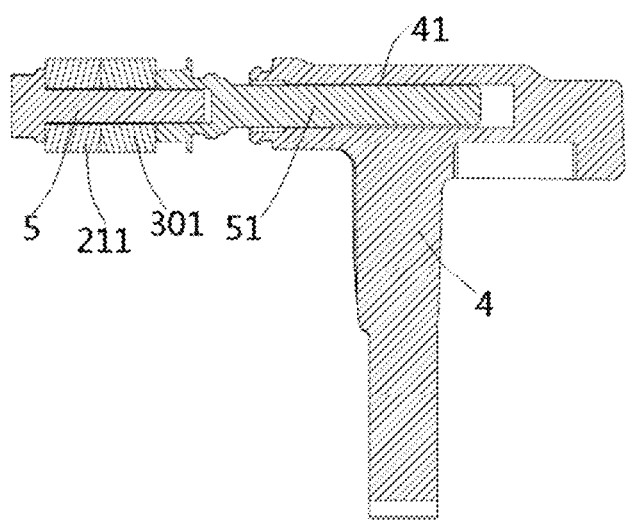
FIG. 4 shows a partial sectional view of the electronic mechanical brake according to an example.

A specific example of an electronic mechanical brake will be further described with reference to FIGS. 3 and 4. In the example shown in FIG. 3, the housing of the transmission device 2 and the brake actuator 3 are separable. The housings of the transmission device and the brake actuator 30 include flanges 211, 301 that define corresponding pairs of bolt holes for connecting the transmission device housing and the brake actuator housing 30 together using a pair of bolts 5. Additionally, as shown in FIG. 4, the bolts 5 pass through the flanges 211, 301 of the transmission device housing 21 and the brake actuator housing 30 and are received by bolt holes on the back side of a pair of axial guide rods 51, thus allowing axial sliding mounting of the brake disc carrier 4 of the brake actuator 3 on the pair of axial guide rods 51, thereby enabling relative axial floating between the brake actuator housing 30 and the brake disc carrier 4. Finally, the assembled electronic mechanical brake is installed on the steering arm 93 shown in FIG. 1 using flanges 43 of the brake disc carrier 4, and the two brake discs on the brake disc carrier 4 are positioned on either side of the brake disc 95.

Figure 5:
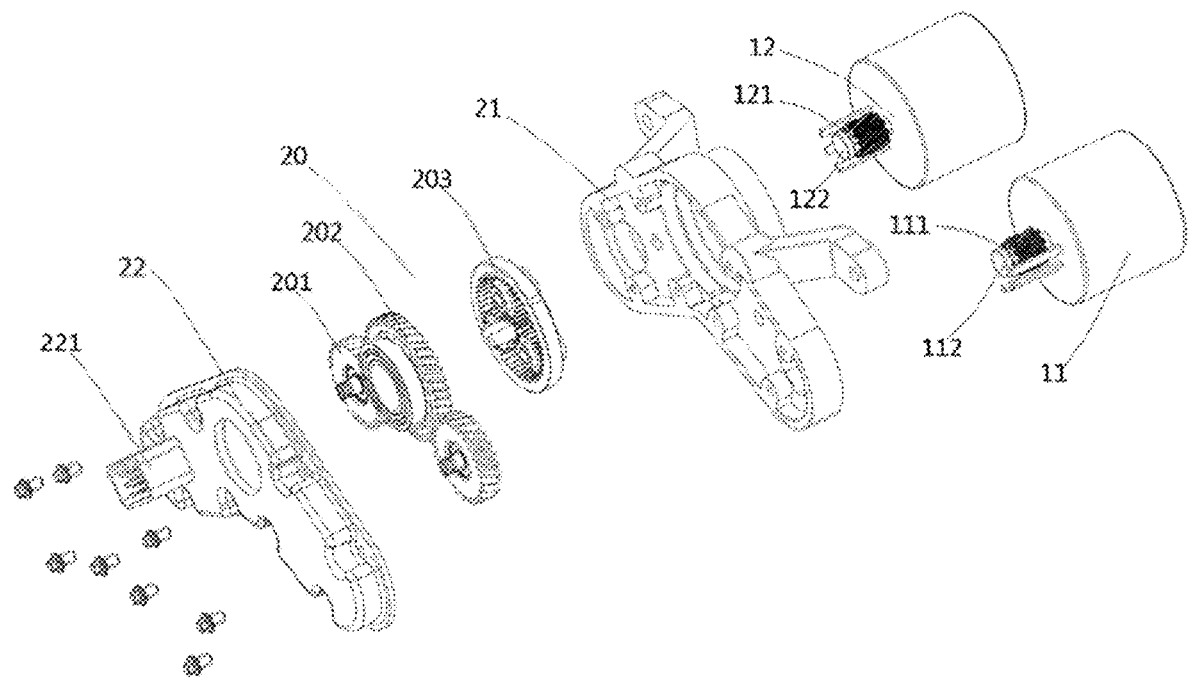
FIG. 5 shows an exploded view of the electronic mechanical brake, excluding the brake actuator portion, according to an example.
Figure 6:
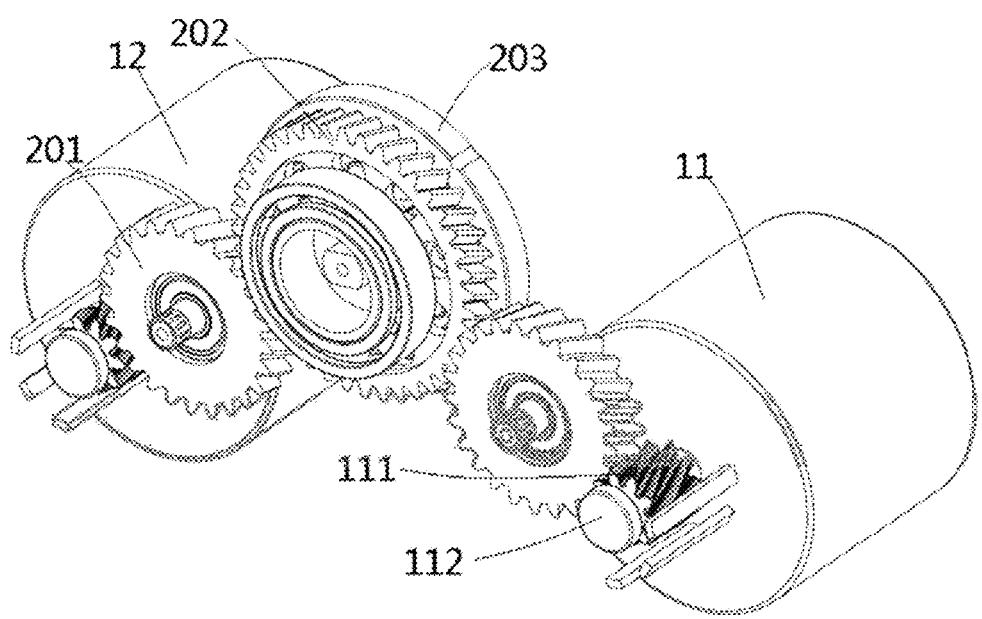
FIGS. 6 and 7 show three-dimensional views of the brake motor and transmission device of the electronic mechanical brake according to one example, from different angles.
Figure 7:
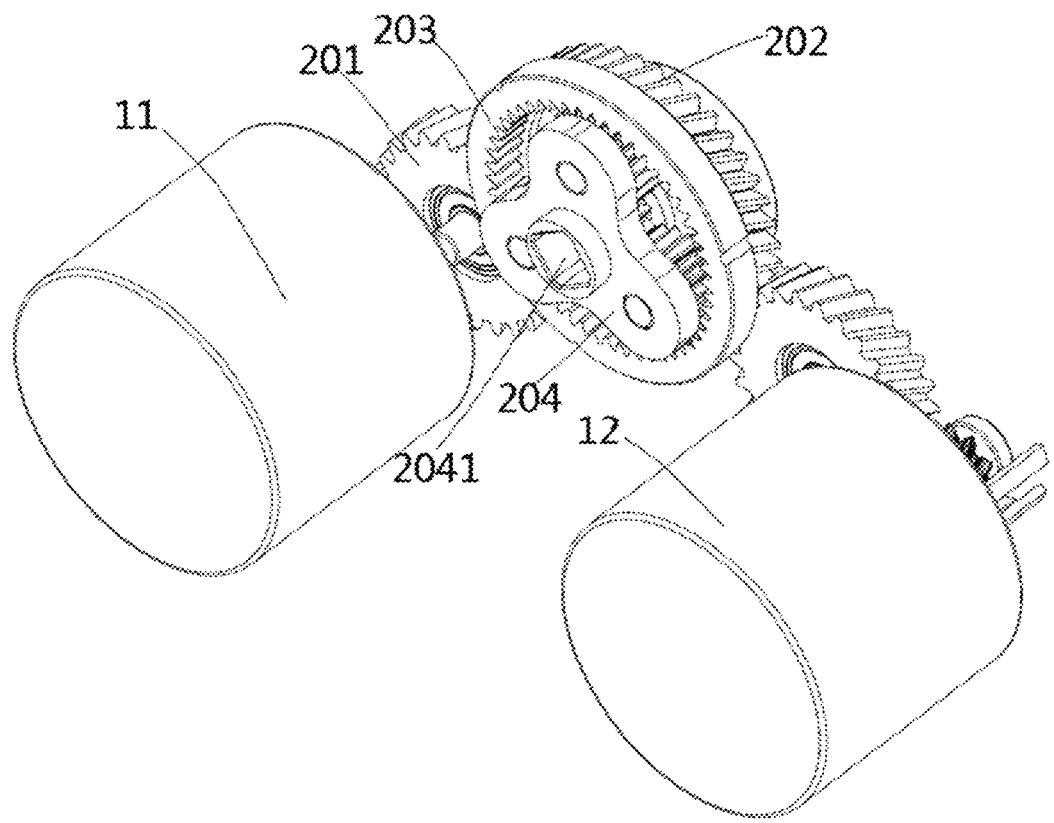
Figure 8:
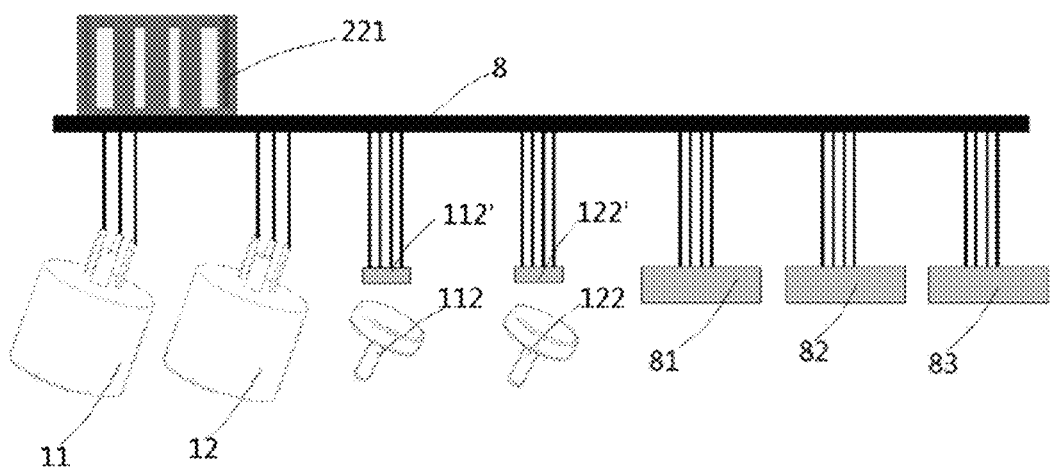
FIG. 8 shows a schematic diagram of component connections for the electronic mechanical brake.
Figure 9:
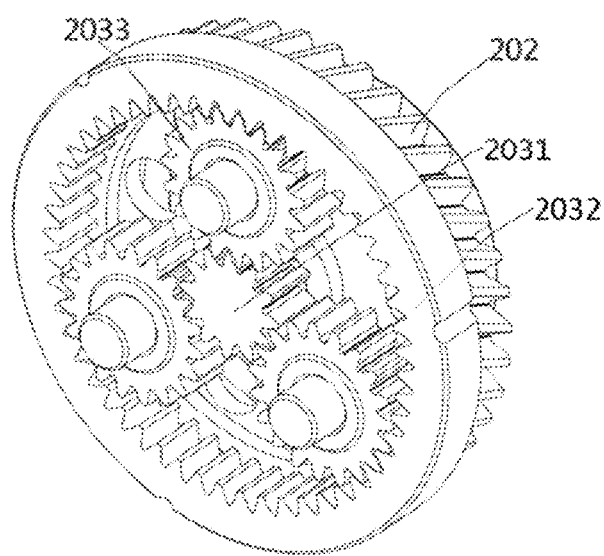
FIG. 9 shows a three-dimensional view of a transmission gear.

Referring further to FIGS. 5 to 7, the specific structure of the electronic mechanical brake is described. The transmission device housing may consist of a first housing portion 21 and a second housing portion 22 connected by bolts, accommodating the transmission gearset 20 of the transmission device 2, including an intermediate gear 201, a hub gear 202, and a planetary gearset 203. In the illustrated example, the first housing portion 21 and the second housing portion 22 are generally shaped like an "H," defining an H-shaped cavity to accommodate the substantially H-shaped transmission gearset. Two brake motors 11 and 12 are mounted on the first housing portion 21, and their output shafts, connected to pinions 111 and 121, extend into the interior cavity and mesh with the corresponding intermediate gear 201. Therefore, in this example, both brake motors and the brake actuation devices are located on the same side of the transmission device 2, resulting in a smaller axial length of the electronic mechanical brake, which can be accommodated in the compact space on the inner side of the wheel hub, while still providing sufficient braking torque in the presence of two brake motors. In some examples, magnetic portions 112 and 122 of position sensors are placed on the output shafts of the two brake motors 11 and 12. Furthermore, corresponding detectors 112' and 122' of the position sensors, such as Hall sensors (FIG. 8), are arranged on a circuit board at positions corresponding to the magnetic portions 112 and 122, to detect changes in the magnetic fields generated by the magnetic portions 112 and 122, thus sensing the phase and speed of the two brake motors 11 and 12. The second housing portion 22 also provides an interface 221 for connection to the vehicle's ECU, enabling communication between the electronic mechanical brake and the ECU. This allows the ECU to control the two brake motors 11 and 12 and obtain information about the status of the brake motors through the position sensors. Additionally, total torque sensors 81 and current sensors 82, 83 corresponding to the brake motors 11 and 12 may be provided, transmitting the total output torque of the electronic mechanical brake and the currents of the two brake motors 11 and 12 to the ECU. With this arrangement, the position sensors provide feedback on the rotational state of the motor's rotor to the ECU, while the torque and current sensors provide feedback on the clamping torque and motor currents to the ECU.

In the illustrated example, the intermediate gear 201 is further meshed with the hub gear 202, while the hub gear 202 is connected to the sun gear 2031 of the planetary gear set 203 for common rotation. The multiple planet gears 2033 of the planetary gear set 203 are positioned between a fixed ring gear 2032 and the sun gear 2031. The multiple planet gears 2033 will mesh and move along with the rotation of the sun gear 2031. The planetary carrier 204 is connected to the multiple planet gears 2033 and rotates therewith. The planetary carrier 204 comprises an axial hole 2041, which will be connected to the input shaft of the braking actuator. As a result, the rotation of the brake motors 11 and 12 is transmitted to the braking actuator 3 via the transmission device 2, which provides reduction and torque amplification.

Figure 10:
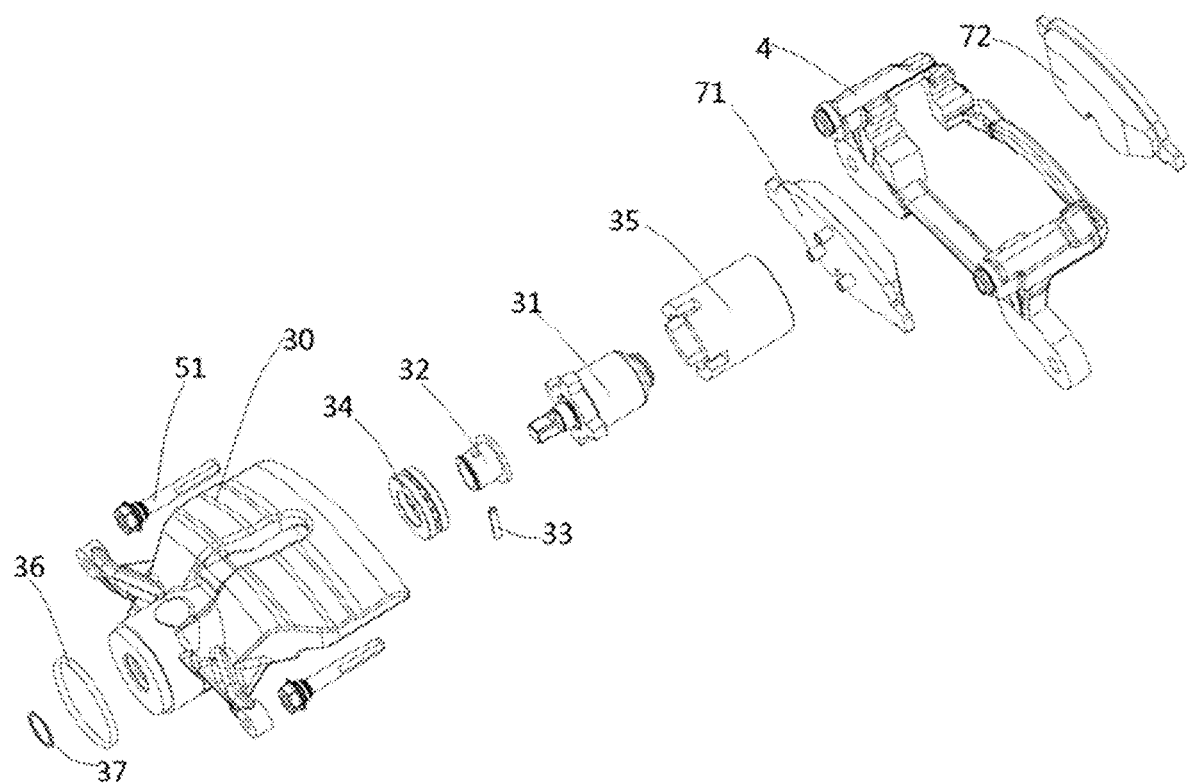
FIG. 10 shows an exploded view of the brake actuator portion of the electronic mechanical brake according to an example.
Figure 11:
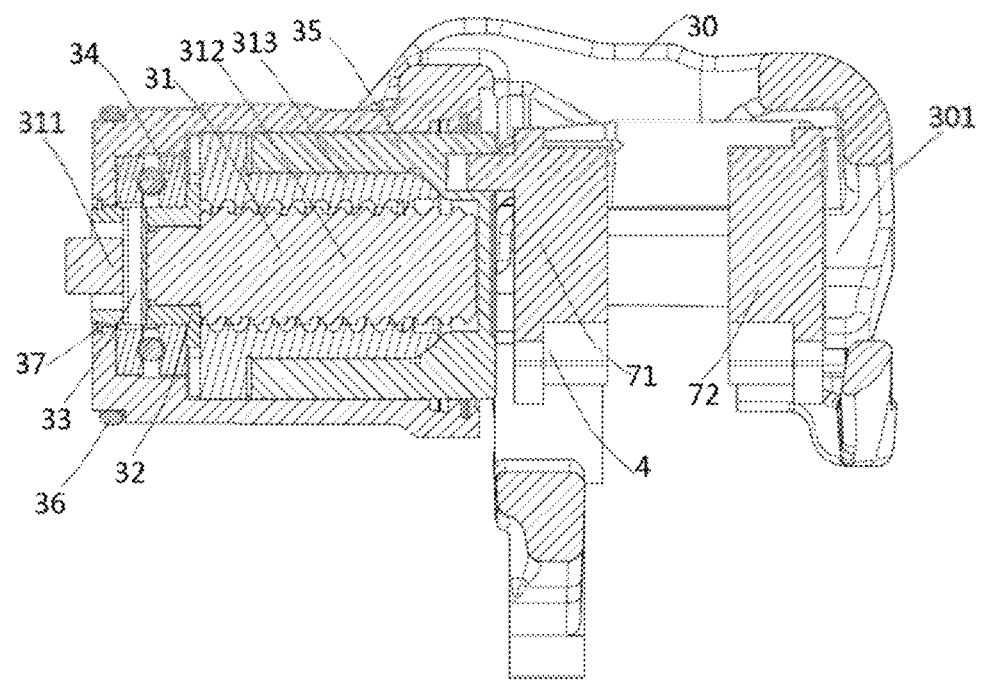
FIG. 11 shows a sectional view of the brake actuator portion of the electronic mechanical brake according to an example.

Referring further to FIGS. 10 and 11, the braking actuator according to the example is described in detail. The braking actuator includes a braking actuator housing 30, which accommodates a screw nut mechanism 31 and a plunger 35. In the illustrated example, the screw of the screw nut mechanism includes an input end 311, which is connected to the transmission device, and a screw body 312 that cooperates with the nut 313. The input end 311, for example, has a cross-sectional shape such as a square, which matches the axial hole 2041 of the planetary carrier to receive torque. Additionally, a sealing ring 36 is provided to provide sealing between the braking actuator and the transmission device. The input end 311 cooperates with a support ring 32 arranged on its outer periphery via a pin 33. The support ring 32 is supported on one side against the rear side of the screw body 312 and is limited axially by a snap ring 37, thus being axially limited but able to rotate together with the screw. The support ring 32 is supported by a bearing 34. In some examples, the bearing 34 is a thrust bearing. Alternatively, the bearing 34 can be a deep groove ball bearing, an angular contact ball bearing, or a center ball bearing, among others. Alternatively, the screw can be supported directly by the bearing.

In some examples, the nut 313 of the screw-nut mechanism is coupled with the plunger 35 in the circumferential direction. For example, the outer side of the nut 313 may have grooves or protrusions that correspondingly engage with protrusions or grooves on the plunger 35. In some examples, the plunger 35 is coupled with the friction disc 71 in the circumferential direction. For instance, the front face of the plunger 35 may have grooves or protrusions along the axial direction that correspondingly engage with protrusions or grooves on the friction disc 71. Furthermore, the friction disc 71 is supported by a friction disc bracket 4, which limits the circumferential movement of the friction disc 71. As a result, both the plunger 35 and the nut 313 are restricted in the circumferential direction, allowing only axial movement and preventing rotational movement. This achieves circumferential limitation and axial movement of the nut 313 in the screw-nut mechanism. Thus, by utilizing the circumferential coupling between the nut and the plunger, as well as the circumferential limitation provided by the friction disc bracket 4 to the friction disc 71, it is unnecessary to include features in the housing specifically aimed at limiting the nut's circumferential movement.

Figure 12:
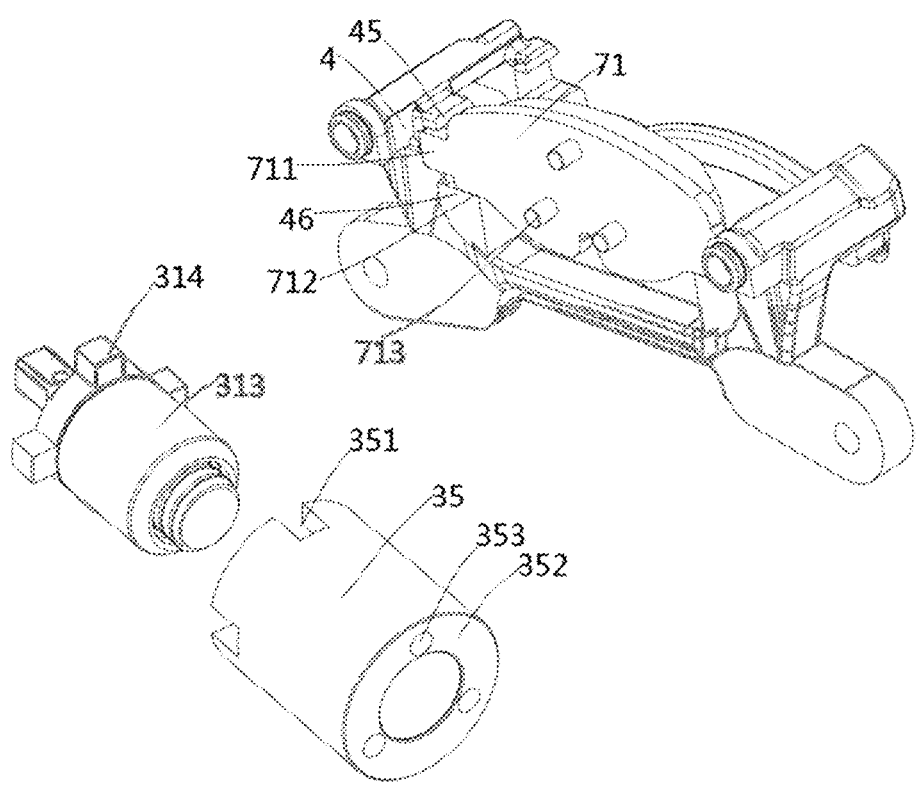
FIG. 12 shows a three-dimensional view of certain components of the brake actuator of the electronic mechanical brake according to an example.
Figure 13:
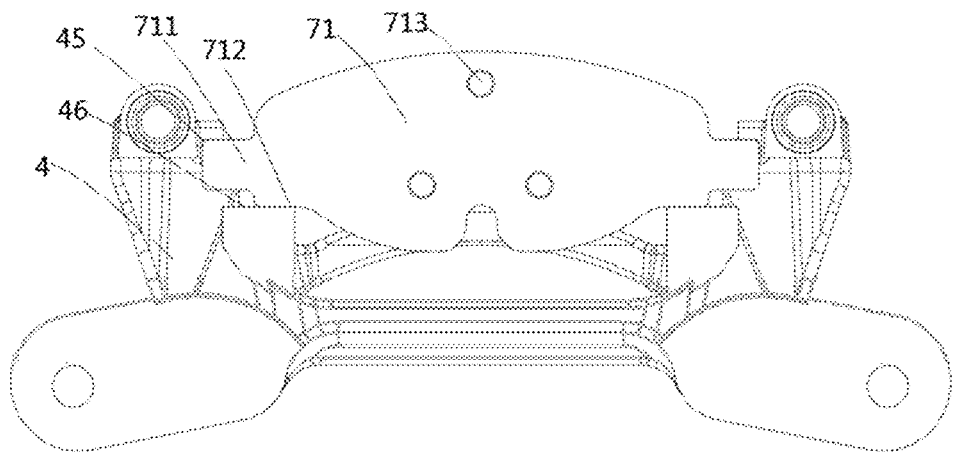
FIG. 13 shows a front view of the friction disc bracket and friction disc of the brake actuator of the electronic mechanical brake according to an example.

Referring further to FIGS. 12 and 13, the specific structure of the nut, plunger, friction disc, and friction disc bracket according to one example is described. In some examples, the outer circumference of the nut 313 has multiple keys 314, and the plunger 35 has a sleeve portion 3 fitted over the outer circumference of the nut 313. The rear side of the cartridge portion has a plurality of slots 351 that mate with the plurality of keys 314, and the mate of the plurality of keys 314 passing through the nut 313 with the plurality of slots 351 of the sleeve portion of the plunger 35 achieves circumferential coupling of both. In some examples, the front face 352 of the sleeve portion has multiple grooves 353, and the adjacent surface of the friction disc 71 facing the front face 352 of the sleeve portion has corresponding multiple protrusions 713. The coupling of the multiple grooves 353 on the front face 352 of the nut with the multiple protrusions 713 on the friction disc 71 achieves their circumferential coupling. It should be understood that the nut 313, plunger 35, and friction disc 71 are not axially coupled to each other; therefore, they can undergo axial displacement relative to one another. However, the multiple keys 314, multiple slots 351, multiple grooves 353, and multiple protrusions 713 should have sufficient axial length to prevent the disengagement of the nut 313, plunger 35, and friction disc 71 from each other during axial displacement.

In some examples, the friction disc 71 is equipped with ears 711 on both ends, and the friction disc 71 is axially limited by inserting the ears 711 into the side grooves 45 of the friction disc bracket 4. In some examples, there may be a gap between the ears 711 of the friction disc 71 and the grooves 45 of the friction disc bracket 4, and damping return springs are provided. In this case, the friction disc 71 also includes shoulders 712 on the inner side of the ears, and the friction disc bracket 4 further comprises a pair of protrusions 46 supporting the shoulders 712 at the two ends of the friction disc, thus achieving the axial limitation of the friction disc 71, while allowing the friction disc 71 to move relative to the friction disc bracket 4 in the axial direction. It should be understood that, although not shown in FIG. 12, as shown in FIG. 11, a counterpart friction disc 72 is also arranged on the friction disc bracket 4 in an opposing manner to the friction disc 71. The counterpart friction disc 72 has a similar shape to the friction disc 71 (but without features for mating with the plunger) and can be arranged to move axially in a similar manner on the friction disc bracket 4. As described earlier, the brake actuator housing 30 is floatily mounted on the friction disc bracket 4 via an axial guiding rod 51. The assembled electromechanical brake is fixed to the steering knuckle arm 93 via a flange 43 on the friction disc bracket 4, so that the friction disc 71 and the counterpart friction disc 72 are located on both sides of the brake disc 95. During the establishment of the torque, the rotation of the brake motor drives the transmission device 2, causing the rotation of the lead screw nut's lead screw, the translation of the nut, and the movement of the plunger, thereby bringing the friction disc 71 into contact with the brake disc 95. Additionally, since the brake disc 95 and the friction disc bracket 4 are fixed, the reaction force on the lead screw 312 is transferred to the brake actuator housing 30 of the electromechanical brake when the nut 313 is translated, causing the brake actuator housing 30 to move in the opposite direction (to the left in FIG. 11). The hook portion 301 of the brake actuator housing will drive the counterpart friction disc 72 to move axially to the left together with the friction disc 71, thus clamping the brake disc 95. When releasing the braking torque, the rotation of the brake disc 95 pushes away the friction disc 71 and the counterpart friction disc 72, providing enough clearance to allow the brake disc 95 to rotate freely until the next braking cycle.

Figure 14:
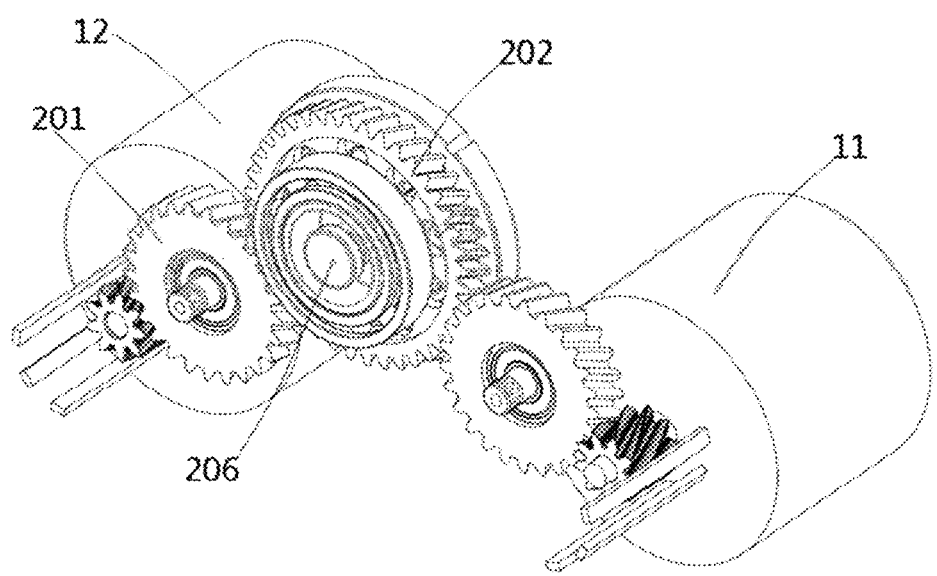
FIGS. 14 and 15 show three-dimensional views of the brake motor and transmission device of an alternative example of the electronic mechanical brake.
Figure 15:
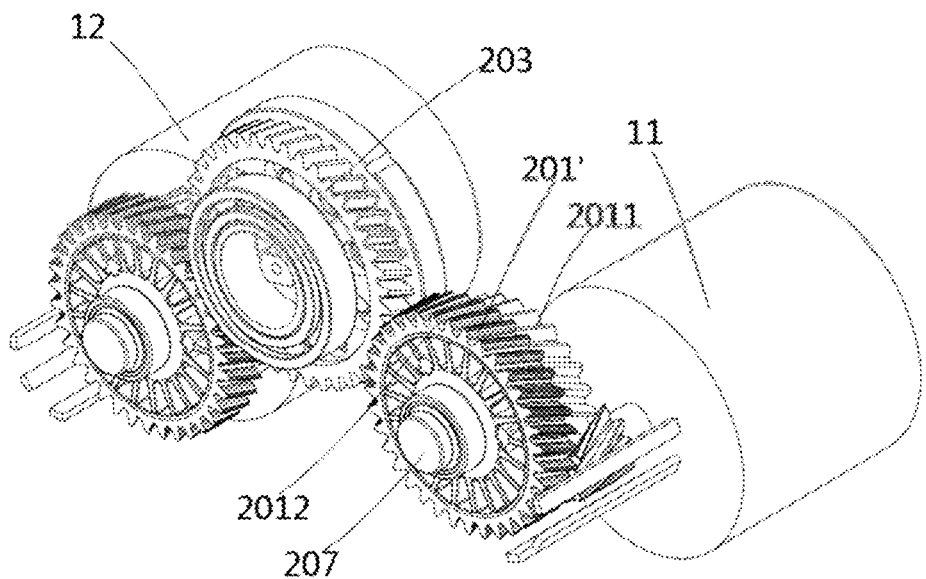
Figure 16:
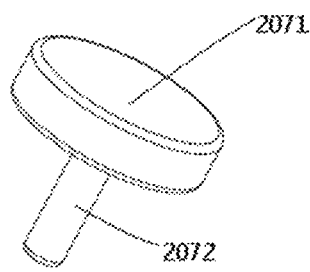
FIGS. 16 to 21 show views of the magnet of the rotational position sensor according to various examples.
Figure 17:
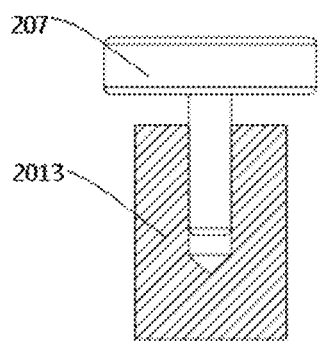
Figure 18:
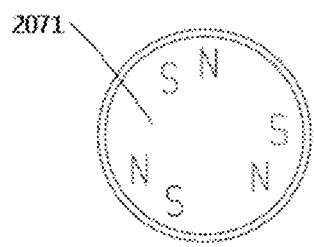
Figure 19:
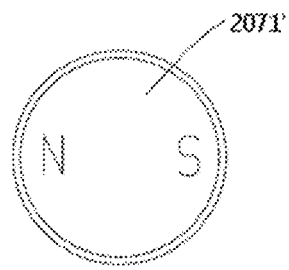

Continuing with reference to FIGS. 14 and 15, further examples of the present utility model are introduced. In the example shown in FIG. 14, compared to the example in FIG. 6, the two rotational position sensor magnets set on the output shaft of the braking motor are changed to a single rotational position sensor magnet 206 set on the hub gear, and the Hall sensors are correspondingly modified. In the example shown in FIG. 15, the intermediate gear 201 is changed to a double gear 201', comprising coaxially interconnected first gear 2011 and second gear 2012, where the first gear 2011 meshes with the small gear on the output shaft of the braking motor, and the second gear 2012 meshes with the hub gear 203. By changing the gear ratio of the double gear, the transmission device's gear ratio can be adjusted according to different user requirements. Additionally, in the example shown in FIG. 15, the magnet 207 of the rotational position sensor can be mounted on the double gear. It should be understood that since the motor output shaft, intermediate gear, and hub gear are meshed with each other, the rotational speed and rotational position of the first motor 11 and the second motor 12 can be directly or indirectly detected by magnets on the motor output shaft, intermediate gear, or hub gear, and these approaches are considered equivalent.

Figure 20:
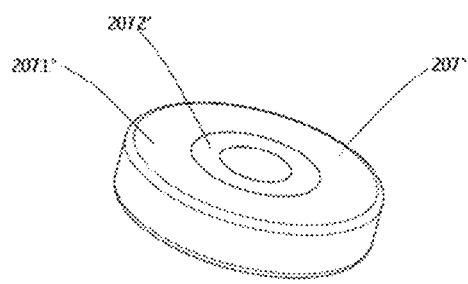
Figure 21:
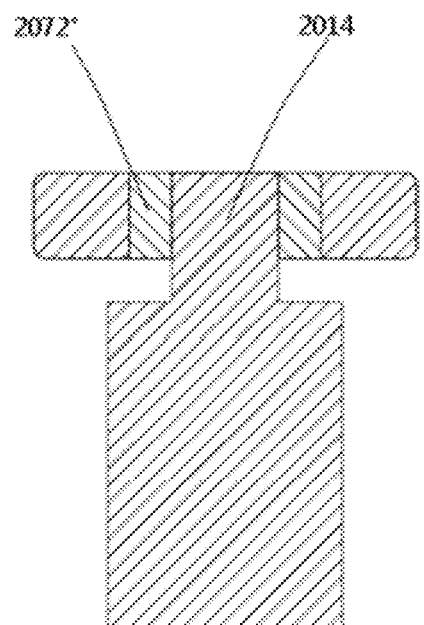

Continuing with reference to FIGS. 16 to 19, the structure of the rotational position sensor magnet is illustrated. In this example, the magnet 207 comprises a disc-shaped magnet portion 2071 and a shaft portion 2072. The shaft portion 2072 is mounted in the shaft hole of the gear shaft 2013, and the disc-shaped magnet portions 2071, 2071' include one or more pairs of magnetic poles spaced 180 degrees apart. Further referring to FIGS. 20 and 21, another structure of the rotational position sensor magnet 207" is shown, comprising an annular magnet portion 2071" and an axle ring 2072" on the inner side of the annular magnet portion 2071". The rotational position sensor magnet is mounted by fitting the axle ring 2072" on the protruding end 2014 of the gear shaft. Similarly, the annular magnet portion 2071" can include one or more pairs of magnetic poles spaced 180 degrees apart. As described above, the rotational position sensor magnet can be mounted on the output shaft of the two braking motors, one or two intermediate gears, or the hub gear using any of the above-mentioned methods or other suitable methods.

Figure 22:
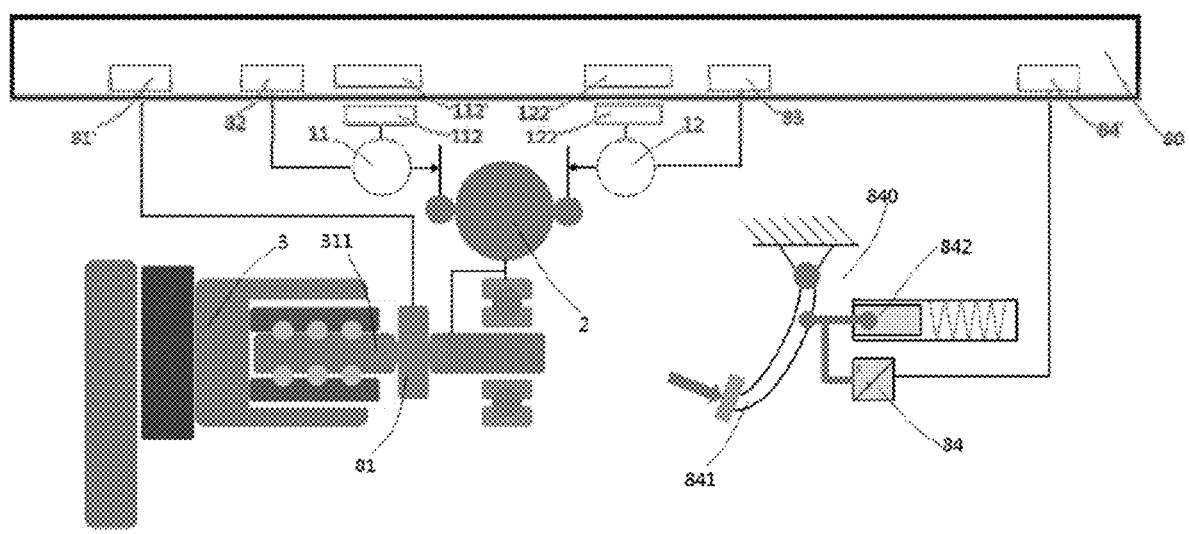
FIG. 22 shows a schematic diagram of the control structure of the electromechanical braking system according to an example.

Continuing with reference to FIG. 22, the electromechanical braking system according to an example is introduced. The control system includes a control method execution device 80, which is, for example, the electronic control unit (ECU) of a vehicle. The ECU obtains the operating state, such as the rotational speed and phase, of the first motor 11 and the second motor 12 through position sensors. The ECU further obtains the operating currents of the first motor 11 and the second motor 12 through current sensors 82 and 83, respectively. Additionally, the ECU obtains the displacement of the brake pedal 841 by using a pedal displacement sensor 84 in the brake pedal device 840. The displacement of the brake pedal 841 is sent to a pedal displacement receiver 84'. Moreover, the brake pedal device 840 includes a pedal feel simulation device 842. Furthermore, the ECU obtains the total output torque of the coupled first motor and second motor, for example, the total output torque of the first motor and the second motor transmitted to the brake actuation system 3 through the transmission device 2. For instance, the torque sensor 81 is set between the transmission device 2 and the brake actuation device 3 to sense the torque at the input end 311 of the brake actuation system 3 and sends it to the brake torque receiver 81'. In an alternative example, the total brake torque can be measured at any suitable position, for example, between the hub gear and the input shaft of the brake actuation device.

Figure 23:
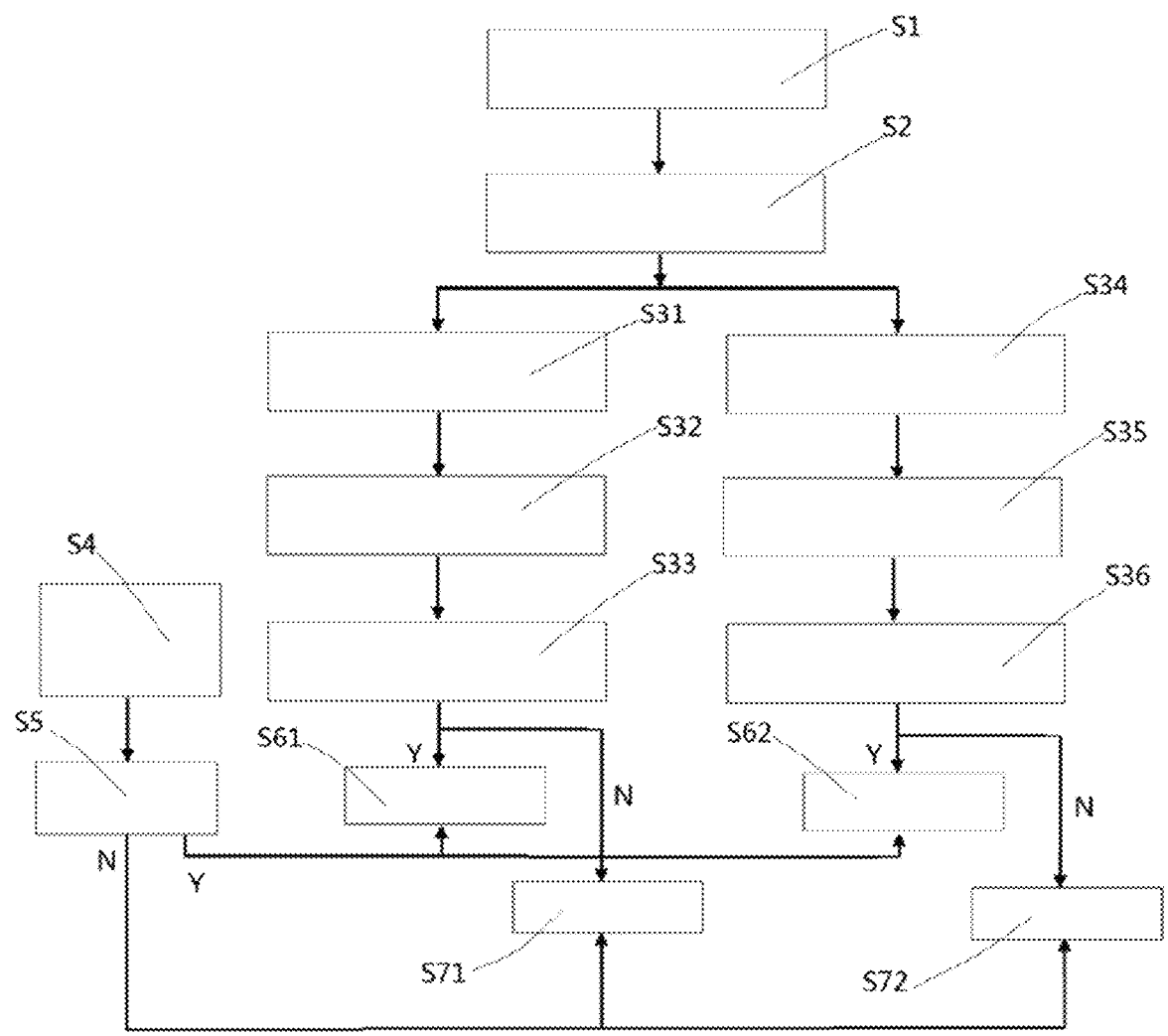
FIGS. 23 to 25 show flowcharts of the control method of the brake system according to an example.

Continuing with reference to FIG. 23, to coordinate the control of the first motor 11 and the second motor 12, the control method of the brake system according to the disclosure may include the following steps: S1 detects the pedal stroke, for example, the pedal position is detected by the pedal displacement sensor 84 and sent to the ECU. Based on the pedal stroke/total brake torque curve, the ECU determines the total required brake torque T. The pedal stroke/total brake torque curve can be adjusted according to user requirements and preset in the ECU. Subsequently, in step S2, the total brake torque is allocated to the first motor and the second motor to determine the target torques $T1\_t$ and $T2\_t$ of the first motor and the second motor. The specific allocation can be pre-set in the ECU. For example, in the simplest example, the target torques $T1\_t$ and $T2\_t$ are evenly distributed to the first motor and the second motor and are sent to the motor control units (MCUs) of the respective motors. Then, in steps S31 and S34, the motor control units operate the first motor and the second motor based on the target torques $T1\_t$ and $T2\_t$. Subsequently, in steps S32 and S35, the operating currents and rotational speeds of the first motor and the second motor are detected using current sensors and motor position sensors, respectively. Based on the operating currents and rotational speeds of the first motor and the second motor and their motor characteristic curves, the calculated output torques $T1\_c$ and $T2\_c$ are obtained. In step S4, the total output torque To of the coupled first motor and second motor is detected using a torque sensor 81 or similar means. In this example, the detection is performed at the input end 311 of the brake actuation device 3. Alternatively, the total output torque can be detected at any suitable position after the coupling of the first motor and the second motor. Subsequently, a benchmark calibration is executed, which includes the following steps: Step S33 verifies if $|T1\_t-T1\_c|\le A1$ is true, if true, executes step S61 to maintain the working state of the first motor; if false, executes step S71 to adjust the first motor. Step S36 verifies if $|T2\_t-T2\_c|\le A2$ is true, if true, executes step S62 to maintain the working state of the second motor; if false, executes step S72 to adjust the second motor. Step S5 verifies if $|T-To|\le A$ is true, if true, executes steps S61 and S62 to maintain the working state of the first motor and the second motor; if false, executes steps S71 and S72 to adjust the first motor or the second motor until $|T1\_t-T1\_c|\le A1$, $|T2\_t-T2\_c|\le A2$, and $|T-To-|\le A$ are all true. The values A, A1, and A2 are set values, for example, within the range of 0 to 0.1. By executing this benchmark calibration step, it can be determined whether the first motor or the second motor is in a normal state and calibrated to serve subsequent motor control. This benchmark calibration can be performed at the initial stage of pressing the brake pedal, or alternatively, at specific intervals of time, specific brake times, specific travel distances, etc., after calibration.

Figure 24:
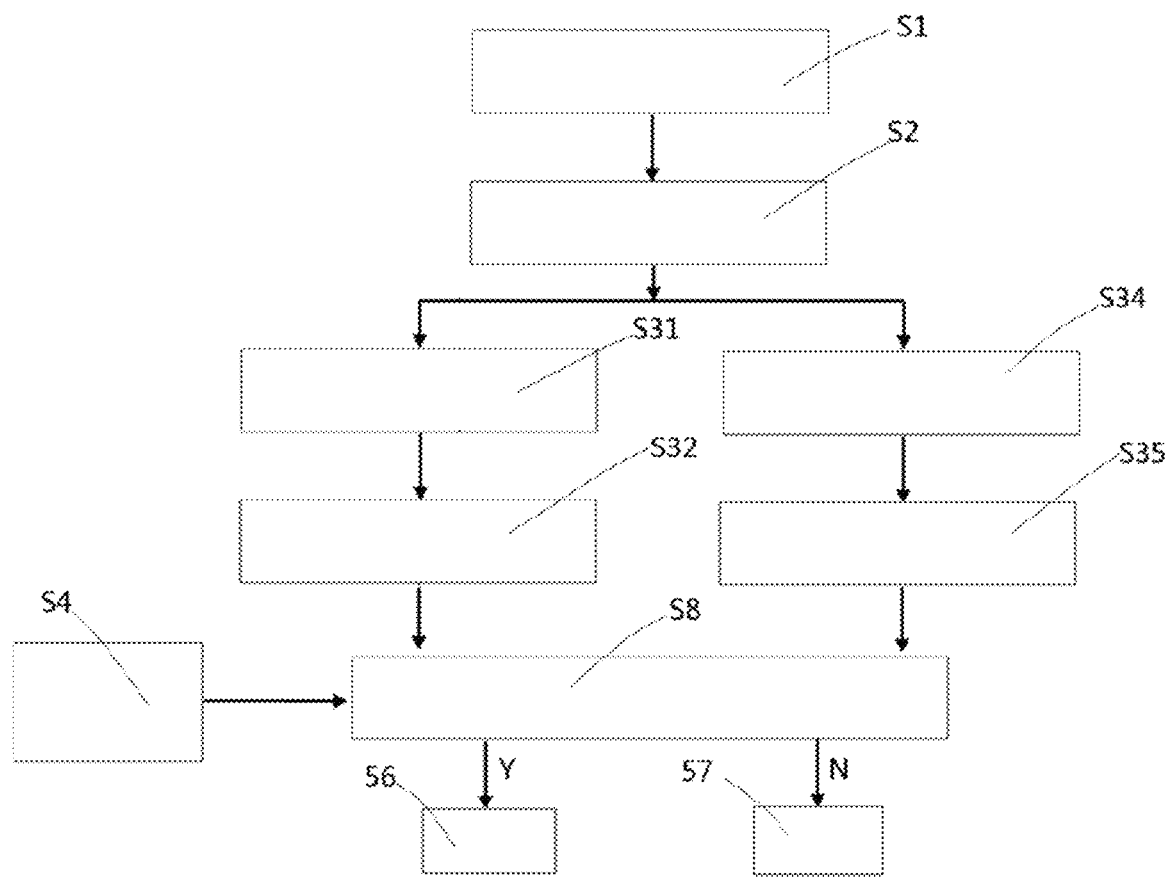

Continuing with reference to FIG. 24, the motor control calibration method according to the examples is introduced. In some examples, after performing the baseline calibration, $T1\_t$ is considered substantially equal to $T1\_c$, and $T2\_t$ is considered substantially equal to $T2\_c$. Therefore, it is not necessary to perform this calibration again during the subsequent control process, and the motor control calibration is executed directly. Specifically, as shown in FIG. 24, steps with the same reference numbers as before step S8 are the same as described in FIG. 23 and are not repeated here. The baseline calibration steps S33, S36, and S5 in FIG. 23 are not executed, and they are replaced by step S8. In step S8, the calculated output torques $T1\_c$, $T2\_c$ of the first motor and the second motor are converted into corresponding torques $T1\_c'$ and $T2\_c'$ at the total output torque detection position based on the gear ratio and transmission efficiency. In this example, the calculated output torques $T1\_c$, $T2\_c$ are converted into corresponding torques at the input terminal 311 of the brake actuator 3 through the conversion of gear ratio and transmission efficiency. The motor control calibration includes the following: checking whether the condition $|T1\_c'+T2\_c'-To|\le B$ holds, where "To" is a set value. If the condition is true, it indicates that the electromechanical brake system is in an optimal working state, and step S6 keeps the first motor and the second motor in operation. If the condition is false, step S7 adjusts the first motor or the second motor, where the numerical value of B is set, for example, in the range of 0 to 0.1. Therefore, the control method according to the examples of the disclosure controls based on the comparison between the calculated torque based on the motor's speed and current and the total output torque during the braking process.

Figure 25:
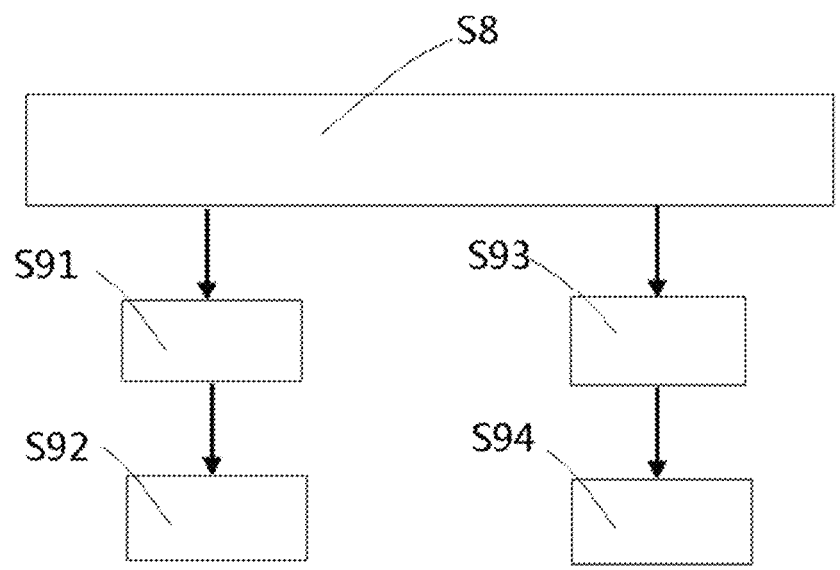

In some example, as shown in FIG. 25, when the equation in step 8 of FIG. 24 is not satisfied, a further fault calibration step is executed: step S91 checks whether $|T1\_c'-To|\le C1$ holds. If true, step S92 determines a fault in the second motor; otherwise, it determines that the second motor has not malfunctioned. Then, step S93 checks whether $|T2\_c'-To|\le C2$ holds. If true, step S94 determines a fault in the first motor; otherwise, it determines that the first motor has not malfunctioned. The numerical values C1 and C2 are set values, for example, in the range of 0 to 0.1. This fault calibration step can be executed synchronously with step S7, or it can be executed when step S8's equation still cannot be satisfied after adjusting several times in step S7.

In some examples, the control method further includes sending a fault signal, such as a sound alarm signal and displaying a warning light on a visible display for the driver when a fault occurs in the first motor or the second motor. At this time, the ECU can execute a backup braking procedure. In this case, one of the first motor and the second motor, which is functioning normally, assumes the total brake torque. That is, upon receiving the brake pedal stroke, the corresponding brake torque is directly allocated to the normally operating motor. When the total brake torque exceeds the rated capacity of the normally operating motor, the normally operating motor is allowed to be overloaded. It should be understood that, to achieve a compact axial distance, this disclosure adopts the technical solution of using two motors instead of a conventional single motor. The sum of the braking torques of the two motors under the total rated current is equal to or less than the braking deceleration required under extreme conditions, such as approaching or equaling 1 g deceleration. In conventional situations, in more than 90% of cases, the required braking deceleration is below 0.25 g. In this case, the braking torque can be provided by the cooperation of the two motors. In the event of a failure of a single motor, the emergency can be handled by allowing the normally operating motor to be overloaded.

Figure 26:
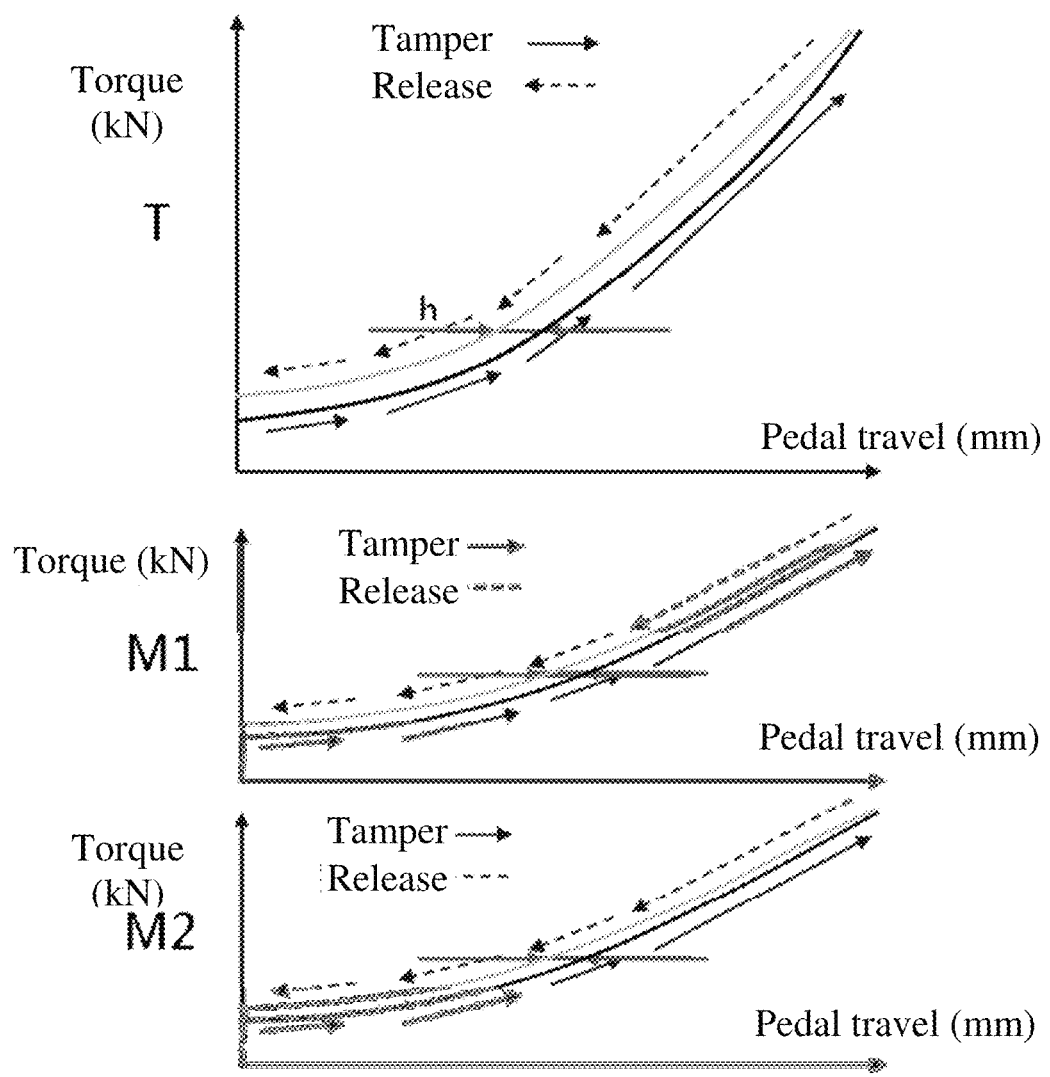
FIGS. 26 to 30 show the brake torque distribution method according to an example.

Continuing with reference to FIG. 26, a torque distribution method according to an example is described. FIG. 26, along with subsequent FIGS. 27 to 30, includes three graphs, corresponding to the brake pedal stroke versus the total torque curve, the brake pedal stroke versus the first motor M1 braking torque curve, and the brake pedal stroke versus the second motor M2 braking torque curve. In general, the braking torque increases with an increase in the brake pedal stroke. There is a certain difference between the braking torque curves when pressing and releasing the brake pedal, meaning that there is a difference h in achieving the same braking torque when pressing and releasing the pedal. This difference h, also known as hysteresis, is used to ensure that the pedal does not follow the foot's movement when releasing it. The steps of allocating the total braking torque to the first motor and the second motor include averaging or proportionally distributing the torque corresponding to the pedal stroke/total braking torque curve to the first motor and the second motor. For example, the first motor 11 and the second motor 12 each bear half of the total braking torque, or the first motor 11 and the second motor 12 bear the total braking torque in a ratio of 3:5 or any other suitable ratio.

Figure 27:
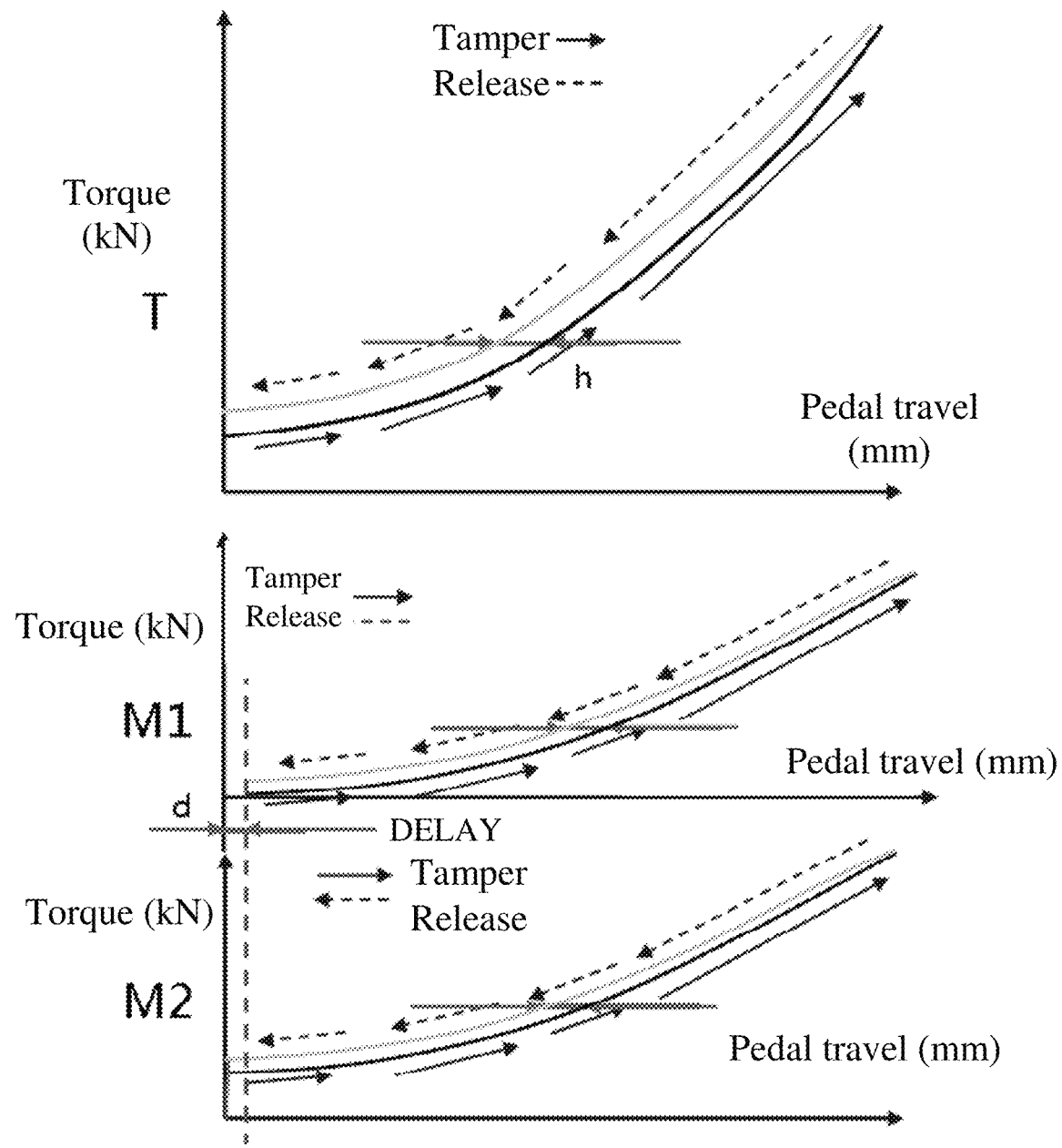

Continuing with reference to FIG. 27, a torque distribution method according to an example is described. In the example shown in FIG. 27, at the beginning, the torque corresponding to the pedal stroke/total braking torque curve is allocated to either the first motor or the second motor. In this example, within the first delay time d, the braking torque is entirely allocated to the second motor M2, while the first motor M1 remains inactive. After the first delay time d, the torque corresponding to the pedal stroke/total braking torque curve is averaged or proportionally distributed between the first motor and the second motor, similar to the manner described in FIG. 26.

Figure 28:
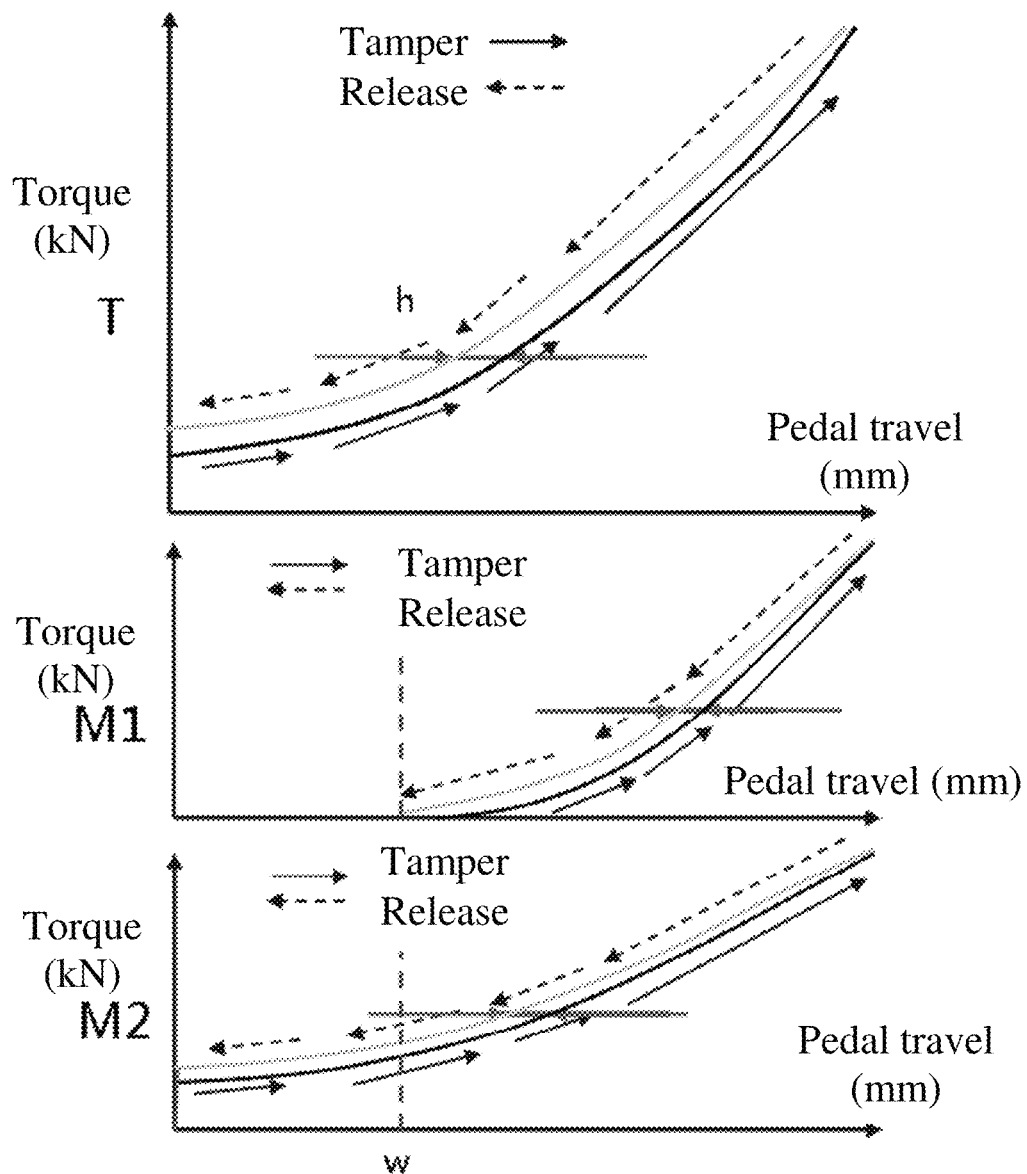

Continuing with reference to FIG. 28, a torque distribution method according to an example is described. In this distribution method, when the brake pedal stroke is less than the first stroke, the torque corresponding to the pedal stroke/total braking torque curve is allocated to either the first motor or the second motor. For example, in the example shown in the figure, when the brake pedal stroke is less than w, the first motor M1 bears all the braking torque while the second motor M2 remains inactive. When the brake pedal stroke is greater than or equal to the first stroke w, the torque corresponding to the pedal stroke/total braking torque curve is averaged or proportionally distributed between the first motor and the second motor, similar to the manner described in FIG. 26.

Figure 29:
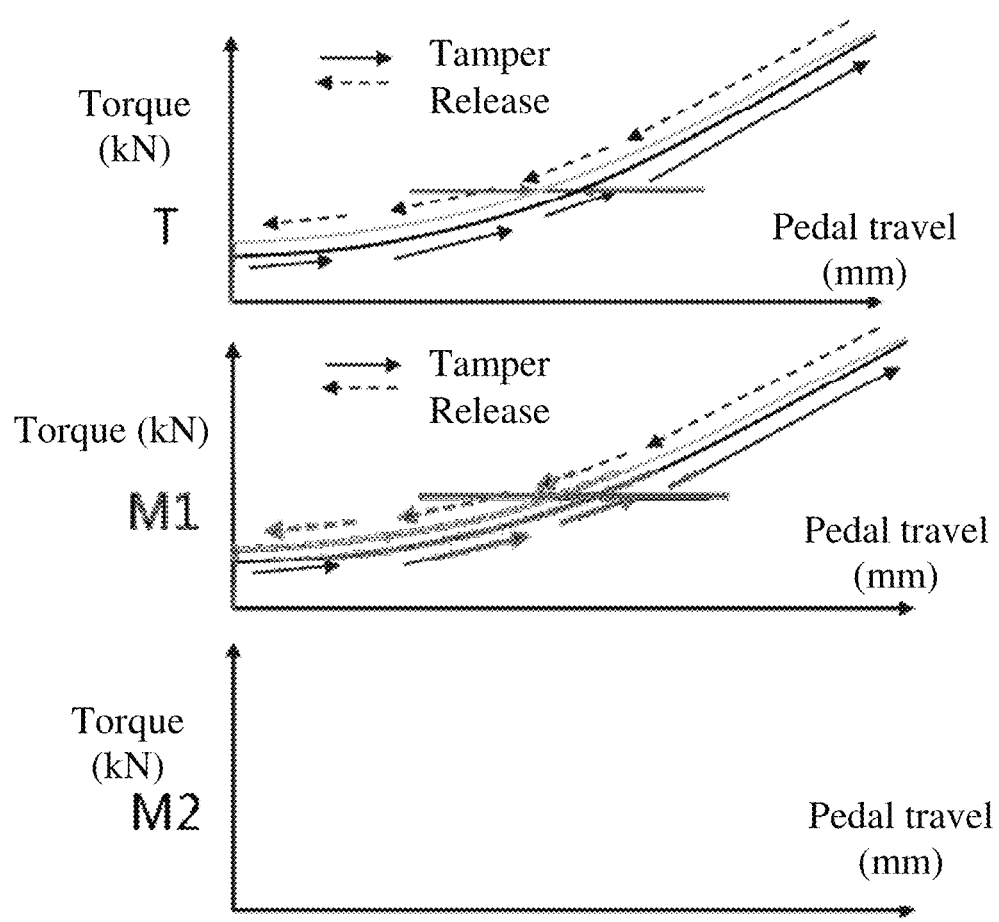

Referring further to FIG. 29, the situation of a second motor M2 fault is illustrated. At this time, all the braking torque is borne by the first motor M1. When the demand for braking torque is high, the ECU allows the first motor M1 to be overloaded.

Figure 30:
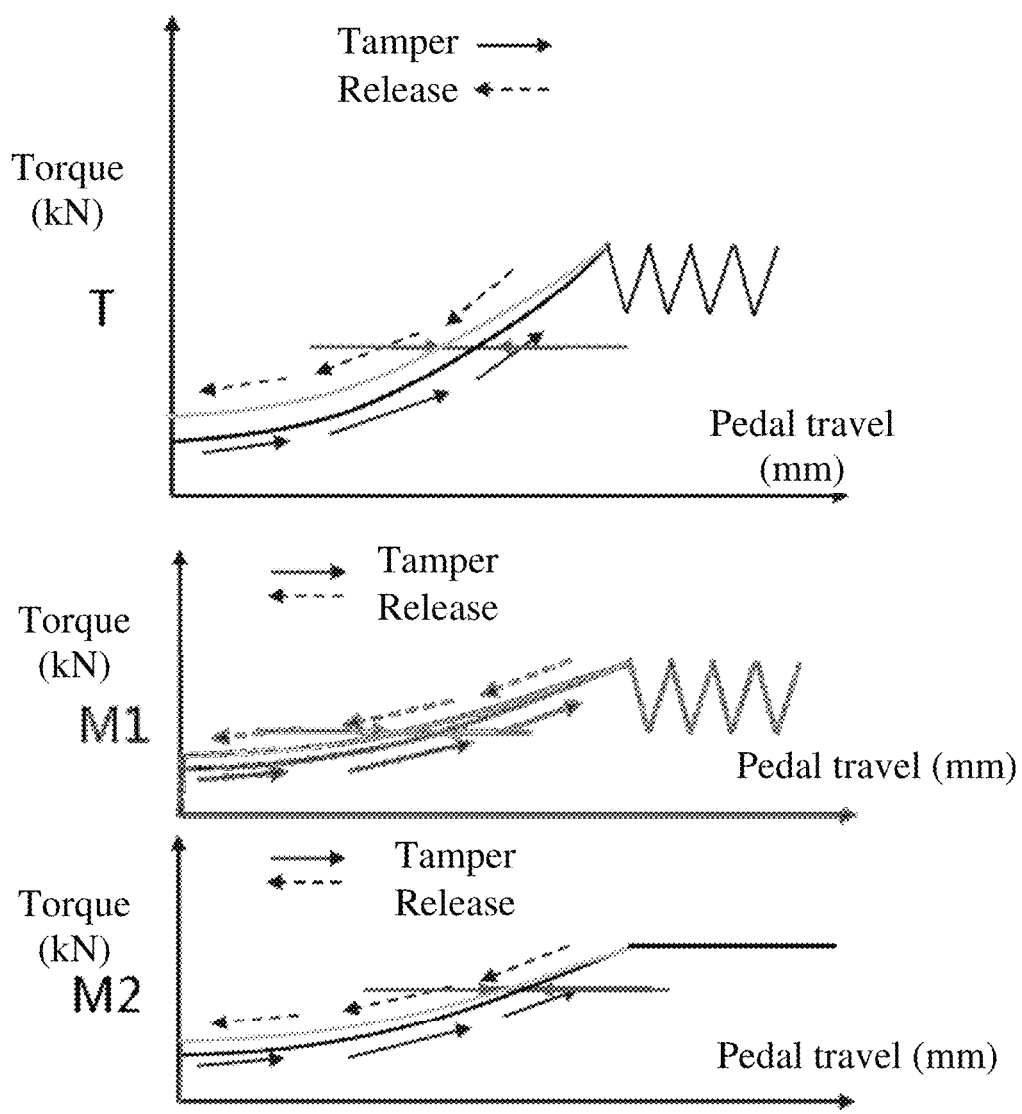

Continuing to refer to FIG. 30, the control method according to the disclosure for achieving an anti-lock braking function is described. When the sensors on the vehicle detect wheel lock-up, the output torque of one of the first motor and the second motor is kept constant, for example, the second motor M2, while causing the output torque of the other of the first motor and the second motor, for example, the first torque M1, to oscillate within a specific range, thereby preventing tire lock-up and vehicle skidding due to depressing the brake pedal too hard. In alternative examples, when the sensors on the vehicle detect wheel lock-up, the output torque of both the first motor M1 and the second motor M2 can oscillate within a specific range, similar to the first motor M1 shown in the figure.

In some examples, the method further includes, upon receiving an automatic emergency braking signal (EBR), the first motor and the second motor directly operating at predetermined emergency braking torques T1_e and T2_e, respectively. The automatic emergency braking is when the sensors on the vehicle detect an imminent collision, and at this time, the brake pedal stroke is not considered.

Figure 31:
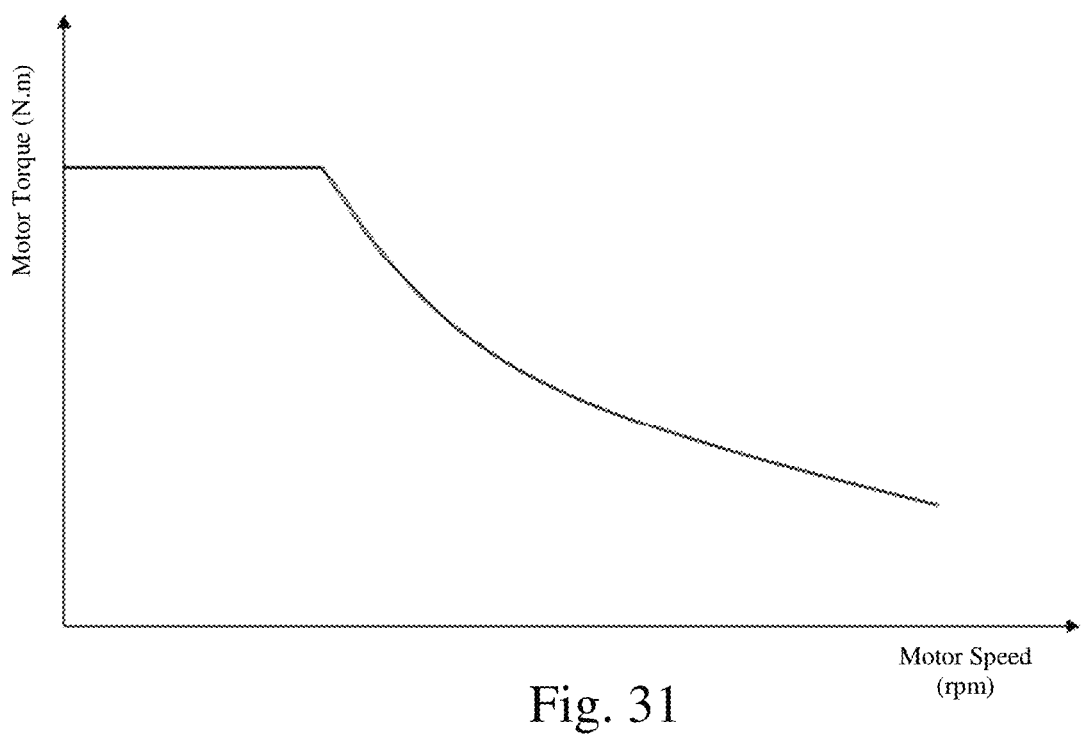
FIG. 31 shows an exemplary motor characteristic curve.

Referring further to FIG. 31, an exemplary motor characteristic curve is shown. The motor characteristic curve corresponds to specific currents. The characteristic curves of each motor at various currents can be obtained by conducting motor performance tests or through calculations. In this curve, when the motor speed is below or equal to a specific value, the motor output torque remains substantially constant, while when the motor speed is higher than the specific value, the motor output torque decreases with an increase in motor speed.

Figure 32:
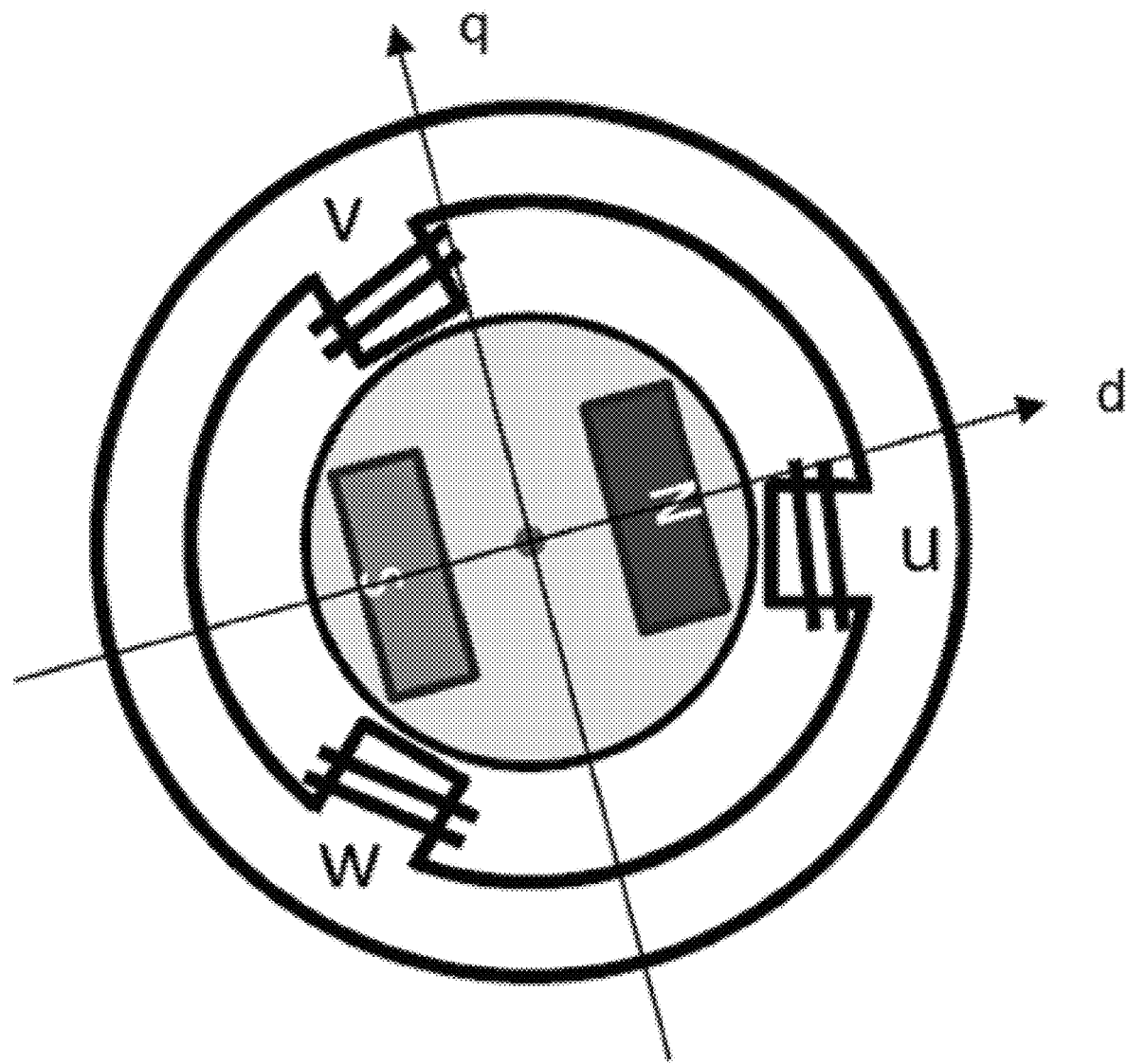
FIG. 32 shows an exemplary motor sectional view.

Referring again to FIG. 32, a cross-sectional view of an exemplary motor is shown. For motors of this type, the motor output torque T can be calculated, for example, using the following equation:

$$T = \frac{3}{2} P(\Psi + (L_d - L_q)I_d)I_q$$

wherein T: Motor output torque; P: Number of rotor magnetic poles; Ψ Main flux (main magnetic linkage); $L_d$: Direct axis inductance; $L_q$ Quadrature axis inductance; $I_d$: Current producing the magnetic flux parallel to the main flux in the stator; $I_q$ Current producing the magnetic flux perpendicular to the main flux in the stator The above method of calculating torque is merely illustrative, and in alternative examples, various other suitable methods can be used to calculate the output torque of each motor. The methods and devices of the examples of the disclosure can achieve coordinated and efficient operation of two motor-driven electromechanical brakes.

The specific examples described above are provided for a clearer understanding of the principles of the disclosure, wherein individual components are clearly shown or described to facilitate a better understanding of the principles of the disclosure. Within the scope of the disclosure, those skilled in the art can easily make various modifications or changes to the disclosure. Therefore, it should be understood that these modifications or changes are included within the scope of the patent protection of the disclosure.

What is claimed is:
1. A control method for a braking system, the braking system comprising an electronically controlled mechanical brake with a first motor and a second motor, the method comprising:
   detecting a pedal stroke and determining a total required braking torque (T) based on a pedal stroke/total braking torque curve;

distributing the total braking torque to the first motor and the second motor to determine a target torque for the first motor (T1_t) and a target torque for the second motor (T2_t);

driving the first motor and the second motor to operate based on the target torques (T1_t) and (T2_t);

monitoring an operating current and a rotational speed of the first motor and the second motor, and using motor characteristic curves of the first motor and the second motor to calculate a first computed output torque (T1_c) and a second computed output torque (T2_c);

calibrating a total output torque (To) of the first motor and the second motor after coupling by:

executing a baseline calibration comprising:

when a first condition |T1_t−T1_c1|≤A1 is true the first motor remains in an operational state;

when the first condition is false the first motor is adjusted;

when a second condition |T2_t−T2_c1|≤A2 is true the second motor remains in an operational state;

when the second condition is false the second motor is adjusted, when a third condition |T−To|≤A is true both the first motor and the second motor remain in the operational states respectively; and when the third condition is false either the first motor or the second motor is adjusted, repeating the above steps until the first condition, the second condition, and the third condition are simultaneously satisfied, wherein A, A1, and A2 are within a range of 0 to 0.1.

2. The control method according to claim 1, further comprising:

after the baseline calibration is performed, performing motor control calibration comprising:

converting the first computed output torque (T1_c) of the first motor and the second computed output torque (T2_c) of the second motor based on a gear ratio into a first converted torque (T1_c') and a second converted torque (T2_c'), respectively, at a detected position of the total output torque;

when a fourth condition |T1_c'+T2_c'−To|≤B is true, maintaining the operational state of the first motor and the operational state of the second motor; and when the fourth condition is false adjusting the first motor or the second motor, wherein B is in a range of 0 to 0.1.

3. The control method according to claim 2, further comprising:

performing a fault calibration comprising:

when a fifth condition |T1_c'−To|≤C1 is true determining a fault in the second motor, when the fifth condition is false determining that the second motor has not encountered the fault, when a sixth condition |T2_c'−To|≤C2 is true determining a fault in the first motor, and when the sixth condition is false determining that the first motor has not encountered the fault, wherein C1 and C2 are in a range of 0 to 0.1.

4. The control method according to claim 3, further comprising:

when (i) one of the first motor and the second motor fails, and (ii) one of the first motor and the second motor is an operational motor, sending a fault signal and causing the operational motor to assume the total braking torque, wherein, when the total braking torque exceeds a rated capacity of the operational motor, the operational motor becomes overloaded.

5. The control method according to claim 1, wherein the distributing the total braking torque to the first motor and the second motor comprises:

either averaging or proportionally distributing the torque corresponding to the pedal travel/total braking torque curve to the first motor and the second motor, or initially assigning the torque corresponding to the pedal travel/total braking torque curve to either the first motor or the second motor, and after a first delay time, averaging or proportionally distributing the torque corresponding to the pedal travel/total braking torque curve to the first motor and the second motor, or when a brake pedal travel is less than a first threshold, assigning the torque corresponding to the pedal travel/total braking torque curve to either the first motor or the second motor, and when the brake pedal travel is greater than or equal to the first threshold, averaging or proportionally distributing the torque corresponding to the pedal travel/total braking torque curve to the first motor and the second motor.

6. The control method according to claim 1, further comprising:

when detecting wheel lock, keeping the output torque of one of the first motor and the second motor constant, and keeping the output torque of the other of the first motor and the second motor oscillates within a specific range; or when detecting the wheel lock, the output torque of both the first motor and the second motor oscillates within the specific range.

7. The control method according to claim 1, further comprising:

when receiving an automatic emergency braking signal, the first motor and the second motor directly operate with predetermined emergency braking torques irrespective of pedal travel.

8. The control method according to claim 1, wherein the pedal travel/total braking torque curve exhibits hysteresis upon depressing and releasing a brake pedal.

9. An electromechanical braking system, comprising:

an electronic mechanical brake; and an electronic control unit connected to the electronic mechanical brake, wherein the electronic mechanical brake comprises:

a first motor;

a second motor;

a transmission device connected to the first motor and the second motor; and a brake actuator connected to the transmission device, wherein the transmission device transfers a braking torque of the first motor and the second motor to the brake actuator, wherein the electromechanical braking system performs a control method comprising:

detecting a pedal stroke and determining a total required braking torque (T) based on a pedal stroke/total braking torque curve;

distributing the total braking torque to the first motor and the second motor to determine a target torque for the first motor (T1_t) and a target torque for the second motor (T2_t);

driving the first motor and the second motor to operate based on the target torques T1_t and T2_t;

monitoring an operating current and a rotational speed of the first motor and the second motor, and using motor characteristic curves of the first motor and the second motor to calculate a first computed output torque (T1_c) and a second computed output torque (T2_c);

calibrating a total output torque (To) of the first motor and the second motor after coupling by:

executing a baseline calibration comprising:

when a first condition $|T1\_t-T1\_c|\le A1$ is true the first motor remains in an operational state;

when the first condition is false the first motor is adjusted;

when a second condition $|T2\_t-T2\_c|\le A2$ is true the second motor remains in an operational state;

when the second condition is false the second motor is adjusted, when a third condition $|T-To|\le A$ is true both the first motor and the second motor remain in the operational states respectively; and when the third condition is false either the first motor or the second motor is adjusted, repeating the above steps until the first condition, the second condition, and the third condition are simultaneously satisfied, and wherein A, A1, and A2 are within a range of 0 to 0.1.

10. The electromechanical braking system according to claim 9, further comprising:

another electronic control unit;

a pedal displacement sensor connected to the other electronic control unit;

current sensors connected to the other electronic control unit and configured to sense a current of the first motor and the second motor;

a rotational position sensor connected to the other electronic control unit and configured to sense a speed of the first motor and the second motor; and a torque sensor connected to the other electronic control unit and configured to sense the total output torque after coupling the first motor and the second motor.

11. The electromechanical braking system according to claim 10, wherein:

the rotational position sensor comprises a detector and a magnet, the magnet of the rotational position sensor is positioned on an output shaft of the first motor and the second motor, or on a gear shaft of an intermediate gear of the transmission device, or on a gear shaft of a hub gear of the transmission device, and (i) the magnet of the rotational position sensor comprises a disc-shaped magnet portion and an axle portion, the magnet of the rotational position sensor is installed in a shaft hole of the gear shaft through the axle portion, the disc-shaped magnet portion includes one or more pairs of magnetic poles spaced 180 degrees apart, or (ii) the magnet of the rotational position sensor comprises a ring-shaped magnet portion and an axle ring inside the ring-shaped magnet portion, and the magnet of the rotational position sensor is set on a protruding end of the gear shaft by fitting on the axle ring, and the ring-shaped magnet portion includes one or more pairs of magnetic poles spaced 180 degrees apart.

12. The electromechanical braking system according to claim 10, wherein the torque sensor is positioned at an input end of the brake actuator.

\* \* \* \* \*

UNITED STATES PATENT AND TRADEMARK OFFICE
CERTIFICATE OF CORRECTION

PATENT NO. : 12,370,988 B2  
APPLICATION NO. : 18/365848  
DATED : July 29, 2025  
INVENTOR(S) : Zhang Page 1 of 1

It is certified that error appears in the above-identified patent and that said Letters Patent is hereby corrected as shown below:

In the Claims

In Claim 1, at Column 11, Line 16: "$|T1\_t - T1\_c1| \leq A1$" should read --$|T1\_t - T1\_c| \leq A1$--.

In Claim 1, at Column 11, Line 20: "$|T2\_t - T2\_c1| \leq A2$" should read --$|T2\_t - T2\_c| \leq A2$--.

Signed and Sealed this  
Thirteenth Day of January, 2026

John A. Squires  
*Director of the United States Patent and Trademark Office*